US012560679B2

(12) United States Patent
Al-Rashid et al.

(10) Patent No.: US 12,560,679 B2
(45) Date of Patent: Feb. 24, 2026

(54) CONFIGURABLE RADAR TILE ARCHITECTURE

(71) Applicant: MACOM Technology Solutions Holdings, Inc., Lowell, MA (US)

(72) Inventors: Yasser Al-Rashid, Northborough, MA (US); Christopher Dirk Weigand, Andover, MA (US); Daniel Robert Kramer, Litchfield, NH (US); Nicholas James Ahlquist, Southborough, MA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 821 days.

(21) Appl. No.: 17/167,512

(22) Filed: Feb. 4, 2021

(65) Prior Publication Data

US 2022/0075022 A1     Mar. 10, 2022

Related U.S. Application Data

(60) Provisional application No. 62/969,951, filed on Feb. 4, 2020.

(51) Int. Cl.
*G01S 7/03* (2006.01)
*H01Q 3/36* (2006.01)

(52) U.S. Cl.
CPC ...... *G01S 7/03* (2013.01); *H01Q 3/36* (2013.01)

(58) Field of Classification Search
CPC .... G01S 7/03; G01S 2013/0254; G01S 7/032; H01Q 3/36
See application file for complete search history.

(56) References Cited

U.S. PATENT DOCUMENTS 6,005,531 A * 12/1999 Cassen .............. H01Q 21/0025
                                                  343/754
6,114,986 A    9/2000 Cassen
                (Continued)

FOREIGN PATENT DOCUMENTS

CN          105958214        9/2016
JP          2004-120325      4/2004
WO          2018/135003      6/2019

OTHER PUBLICATIONS

G. D. Morrison, A. D. McLachlan and A. M. Kinghorn, ""Tile"-based airborne phased array radar systems," International Conference on Radar Systems (Radar 2017), 2017, pp. 1-4, doi: 10.1049/cp.2017.0408. (Year: 2017).*
(Continued)

*Primary Examiner* — Vladimir Magloire
*Assistant Examiner* — Yonghong Li
(74) *Attorney, Agent, or Firm* — Faegre Drinker Biddle & Reath LLP

(57) ABSTRACT

A configurable phased array tile is disclosed including an aperture assembly having a plurality of aperture assembly connectors, a backplane assembly having a plurality of backplane assembly connectors, and a plurality of vertical transmit cards mounted to a corresponding first plurality of aperture assembly connectors and a corresponding first plurality of backplane assembly connectors. The plurality of vertical transmit cards each include a plurality of transmit channels including at least one high power transmit amplifier for powering at least one radiating element mounted to the aperture assembly.

20 Claims, 10 Drawing Sheets

(56) References Cited

U.S. PATENT DOCUMENTS

| | | | |
|---|---|---|---|
| 7,663,546 B1 | 2/2010 | Miyamoto | |
| 9,653,820 B1 | 5/2017 | West | |
| 10,694,637 B1 * | 6/2020 | Wolf | H01Q 1/002 |
| 2003/0189515 A1 | 10/2003 | Jacomb-Hood | |
| 2013/0183913 A1 | 7/2013 | Tevell | |
| 2015/0015453 A1 | 1/2015 | Puzella | |
| 2017/0160389 A1 | 6/2017 | Vacanti | |
| 2018/0131081 A1 | 5/2018 | Wu | |
| 2019/0356055 A1 | 11/2019 | Saito | |

OTHER PUBLICATIONS

International Search Report and Written Opinion issued by the International Searching Authority, dated Dec. 2, 2021, for International Patent Application No. PCT/US21/16581; 9 pages.

International Preliminary Report on Patentability issued by The International Bureau of WIPO, dated Jul. 28, 2022, for International Patent Application No. PCT/US2021/016581; 9 pages.

Office Action issued by the Japanese Patent Office on Jul. 18, 2023, for Japanese Patent Application No. 2022-540996; 6 pages.

English translation of Office Action issued by the Japanese Patent Office on Jul. 18, 2023, for Japanese Patent Application No. 2022-540996; 5 pages.

Extended European Search Report issued by the European Patent Office, dated Jan. 29, 2024, for European Patent Application No. 21781223.9; 19 pages.

* cited by examiner

28

70

31

30

CONFIGURABLE RADAR TILE ARCHITECTURE

CROSS-REFERENCE TO RELATED APPLICATION

The present application claims the benefit of U.S. Provisional Patent Application No. 62/969,951, filed Feb. 4, 2020, the entire disclosure of which is incorporated by reference herein.

FIELD OF THE DISCLOSURE

The present disclosure generally relates to phased array radar systems and more particularly to a tile architecture for a phased array radar system with a configurable design to support a wide range of radar applications.

BACKGROUND OF THE DISCLOSURE

Radar systems have a variety of applications including for weather monitoring, air traffic surveillance and homeland defense. Conventional rotating dish radar systems locate and track targets (e.g., weather events, airplanes, etc.) by mechanically causing a main beam to rotate 360 degrees and measuring signals reflected by items in the path of the beam. Phased array radar systems, on the other hand, use a fixed antenna aperture, often four oriented in different directions to cover a hemisphere. Each aperture includes a plurality of tiles, and each tile has a plurality radiating elements. The aperture is controlled electrically to steer a main beam by manipulating each radiating element phase setting, which collectively may number in the hundreds or even thousands. The waveform from the radar transmitter is fed to the individual radiating elements with a phase progression such that the transmitted waveform of each element combines in free space to increase the radiation in a desired direction while cancelling in other directions. Thus, by changing the energy from the individual elements and slightly shifting the phase of the radio waves emitted, the control for each panel generates overlapping waves that are swept nearly instantly across the area of coverage of the aperture. In this manner, without requiring mechanical movement or rotation of the system, a phased array radar can provide essentially constant coverage of an entire hemisphere or be directed almost instantly from object to object as the objects come into range.

The prevailing architecture of tile-based phased array systems has evolved from a brick-based configuration where the component layers were oriented perpendicular to the face of the array to a flat, planar design where the layers are parallel to the face of the array. The planar architecture is more cost-effective in that it is easier to manufacture and simplifies signal routing requirements Instead of using multiple transmit/receive modules ("TRMs") perpendicular to the array face, as in the brick-based configuration, with its associated complex mechanical, RF, power and digital interfaces, the planar architecture integrates the TRM functionality within the plane of the aperture assembly and routes RF, digital signals and power within the circuitry of the aperture assembly.

While the planar architecture is an improvement over earlier configurations, it still presents opportunities for improvement. For example, the multi-layer aperture assembly can be costly to manufacture because it requires a larger number of layers in the aperture assembly to route signals to the various components. Additionally, the integrity of a large number of solder joints between the components and the aperture assembly must be maintained. In some cases, these components will experience a high level of stress as the heat sinks required for thermal management expand and contract with temperature variations. Finally, the conventional planar architecture is not easily modified for different applications because, among other things, changes to the transmit amplifiers (e.g., from GaAs amplifiers to GaN amplifiers) require a redesign to the aperture assembly. Thus, there is a need for a new radar tile architecture that addresses these and other problems with conventional approaches.

SUMMARY

According to one embodiment, the present disclosure provides a configurable phased array tile architecture, comprising: an aperture assembly having a plurality of aperture assembly connectors; a backplane assembly having a plurality of backplane assembly connectors; and a plurality of vertical transmit cards mounted to a corresponding first plurality of aperture assembly connectors and a corresponding first plurality of backplane assembly connectors; wherein the plurality of vertical transmit cards each include a plurality of transmit channels including at least one high power transmit amplifier for powering at least one radiating element connected to the aperture assembly. One aspect of this embodiment further comprises a plurality of vertical receive cards mounted to a corresponding second plurality of aperture assembly connectors and a corresponding second plurality of backplane assembly connectors, each of the plurality of vertical receive cards including a plurality of receive channels. In another aspect, the backplane assembly includes a plurality of removable daughter card assemblies including a controller daughter card assembly and a power supply daughter card assembly. In yet another aspect, each of the plurality of vertical transmit cards includes a heat sink mounted to a side of the vertical transmit card to draw heat from the at least one high power transmit amplifier. A variant of this aspect further comprises at least one fan positioned to force air flow through at least one channel between rows of the plurality of vertical transmit cards. In still another aspect, each of the plurality of vertical transmit cards includes signal routing for power and control signals from the backplane assembly to the aperture assembly. In another aspect of this embodiment, the backplane assembly includes a transmit splitter circuit for splitting a transmit signal to the plurality of vertical transmit cards. In a variant of this aspect, each of the plurality of vertical transmit cards includes a transmit splitter to split the transmit signal to the plurality of transmit channels.

In another embodiment, the present disclosure provides a phased array radar system, comprising: an antenna assembly including at least one panel with a corresponding aperture face including at least one configurable tile; and a base configured to support the antenna assembly; wherein the at least one configurable tile includes an aperture assembly having a plurality of aperture assembly connectors, a backplane assembly having a plurality of backplane assembly connectors, and a plurality of vertical transmit cards mounted to a corresponding first plurality of aperture assembly connectors and a corresponding first plurality of backplane assembly connectors; wherein the plurality of vertical transmit cards each include a plurality of transmit channels including at least one high power transmit amplifier for powering at least one radiating element connected to the aperture assembly. In one aspect of this embodiment, the at least one configurable tile further includes a plurality of vertical receive cards mounted to a corresponding second plurality of aperture assembly connectors and a corresponding second plurality of backplane assembly connectors, each of the plurality of vertical receive cards including a plurality of receive channels. In another aspect, the backplane assembly includes a plurality of removable daughter card assemblies including a controller daughter card assembly and a power supply daughter card assembly. In yet another aspect, each of the plurality of vertical transmit cards includes a heat sink mounted to a side of the vertical transmit card to draw heat from the at least one high power transmit amplifier. A variant of this aspect further includes at least one fan positioned to force air flow through at least one channel between rows of the plurality of vertical transmit cards. In another aspect of this embodiment, each of the plurality of vertical transmit cards includes signal routing for power and control signals from the backplane assembly to the aperture assembly. In still another aspect, the backplane assembly includes a transmit splitter circuit for splitting a transmit signal to the plurality of vertical transmit cards. In a variant of this aspect, each of the plurality of vertical transmit cards includes a transmit splitter to split the transmit signal to the plurality of transmit channels.

In yet another embodiment, the present disclosure provides a radar tile, comprising: a plurality of radiating elements mounted on an aperture face; a plurality of transmit cards removably connected to the aperture face and oriented perpendicular to the aperture face, the plurality of transmit cards each including a plurality of transmit amplifiers configured to provide a transmit signal to a corresponding plurality of radiating elements; and a backplane assembly configured to provide the transmit signal to the plurality of transmit cards. On aspect of this embodiment further comprises a plurality of receive cards removably connected to the aperture face and oriented perpendicular to the aperture face, the plurality of receive cards each including a plurality of receive channels. In another aspect, the backplane assembly includes a plurality of removable daughter card assemblies including a controller daughter card assembly and a power supply daughter card assembly. In yet another aspect, each of the plurality of transmit cards includes a heat sink mounted to a side of the transmit card to draw heat from the plurality of transmit amplifiers.

BRIEF DESCRIPTION OF THE DRAWINGS

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electro-magnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1:
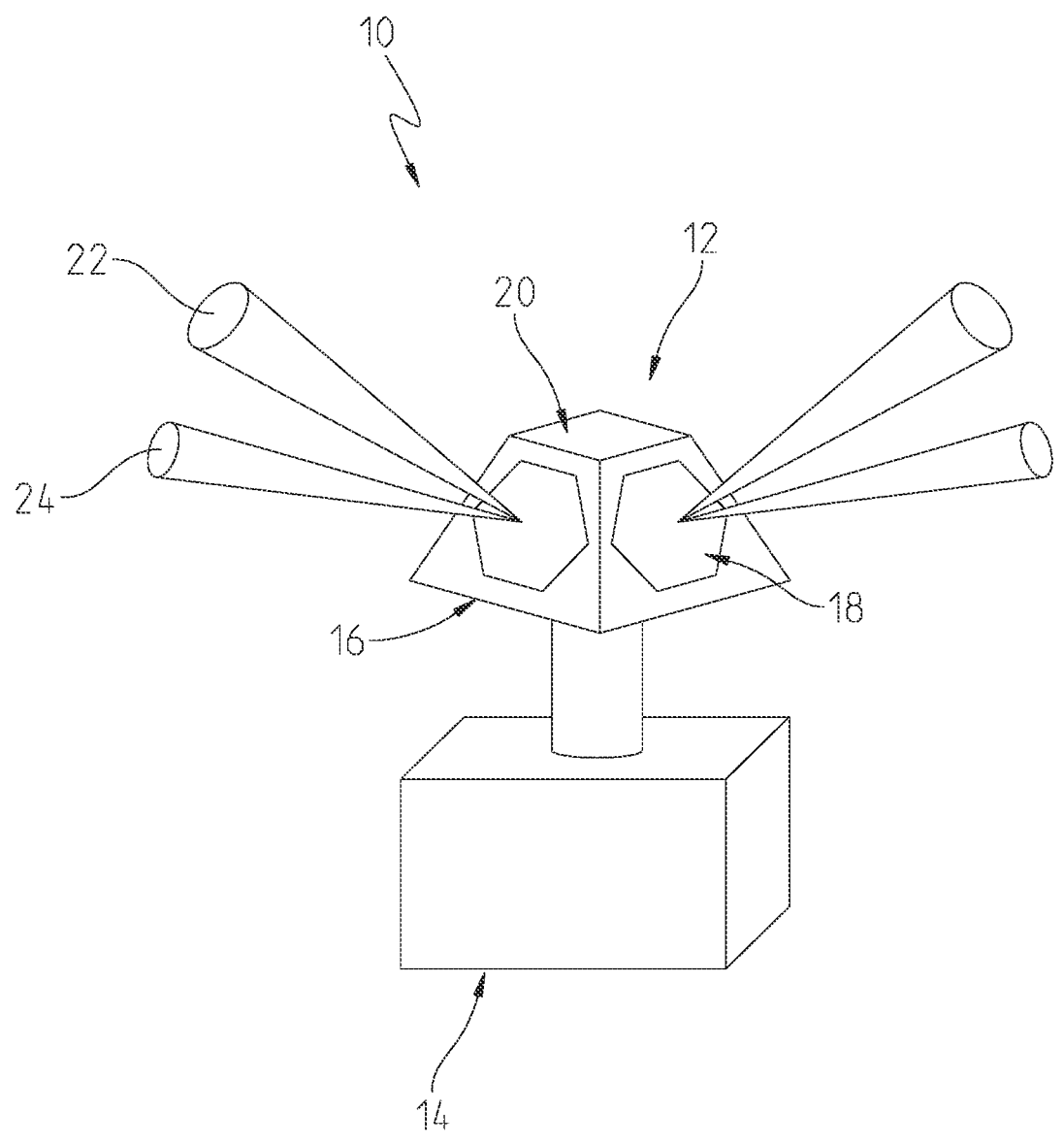
FIG. 1 is a perspective view of a phased array radar system, according to an embodiment.
Figure 2:
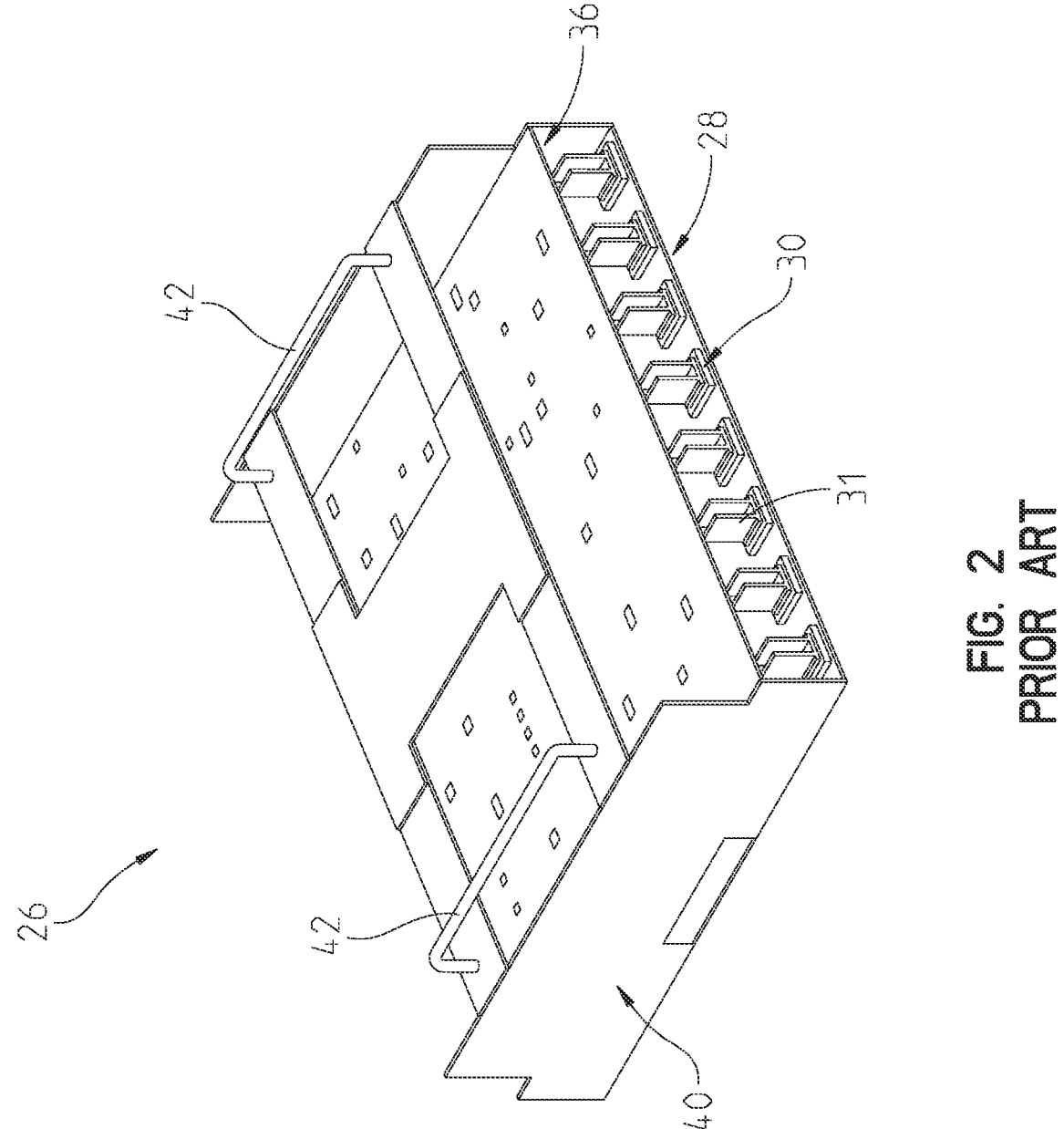
FIG. 2 is a perspective view of a conventional tile for a radar system.

FIG. 1 is a diagram illustrating a phased array radar system 10, according to an embodiment. In an embodiment, system 10 is an S-Band radar system configured to operate in the S-Band (e.g., 2 GHz to 4 GHz) frequency range. In other embodiments, system 10 is configured to operate in a suitable frequency range different from the S-Band frequency range, such as any suitable frequency range from the ultra-high frequency (UHF) frequency range (e.g., as low as 0.3 GHz) to the Ku-band frequency range (e.g., as high as 18 GHz), for example. As just some examples, system 10 is configured to operate in the C-Band frequency range, X-Band frequency range, etc., in some embodiments. System 10 generally includes an antenna assembly 12 and a base 14. While a fixed base 14 is shown, it should be understood that antenna assembly 12 may be mounted on a movable platform such as an aircraft, a watercraft or a land vehicle, in some embodiments. Additionally, portions of antenna assembly 12 may be mechanically movable (e.g., to change the elevation direction) in certain applications. Antenna assembly 12 generally includes at least one aperture 16 with a corresponding aperture face 18, which may consist of one or more tiles as described below. In depicted system 10, four apertures 16 (only two shown) are arranged in 90 degree relationship to one another to provide 360 degree beam coverage of an entire hemisphere. A top radar structure 20 is connected between the four panels 16. It should be understood that a protective enclosure (e.g., a radome) as is known in the art may be positioned over the apertures 16 and the top radar structure 20 to provide protection against the elements. In certain embodiments, each aperture face 18 can produce clusters of beams having different characteristics for locating and tracking different targets. For example, in an embodiment, a first cluster of beams 22 from each aperture face 18 (only one beam 22 shown) may be suited for aircraft surveillance and a second cluster of beams 24 (only one beam 24 shown) may be suited for weather surveillance. In other embodiments, each aperture face 18 can produce more than two clusters of beams for locating and tracking more than two different targets, or each aperture face 18 can produce only a single cluster of beams for locating and tracking only a single target.

As indicated above, each aperture face 18 includes one or more tiles, with each of the one or more tiles including a plurality of radiating elements. A conventional tile 26 of planar architecture is depicted in FIGS. 2-5. As shown, tile 26 generally includes an aperture assembly 28, a plurality of TRMs 30, a plurality of stand-offs or spacers 32, a plurality of unpopulated vertical cards 34, a backplane assembly 36, a transmit driver 38, a housing or panel structure 40 and a pair of handles 42. Housing 40 is connected to the assembly of the above-described components of tile 26 to provide protection and rigidity for the unit. Handles 42 are attached to panel structure 40 to facilitate installation and relocation of tile 26. Aperture assembly 28 includes a plurality of antennas or radiating elements 44 (e.g., antenna patch elements) mounted on the outward surface 46 of aperture assembly 28 in a grid pattern. Other features of aperture assembly 28 are discussed in detail below.

TRMs 30 are arranged in a grid corresponding to the grid pattern of radiating elements 44 and are mounted within a cavity (described below) formed on the inner surface 48 of aperture assembly 28. Finned heatsinks 31 are affixed to the back side of TRMs 30 (two are omitted in FIG. 5) and extend into the space created between aperture assembly 28 and backplane assembly 36 by spacers 32 as described below. Spacers 32 are secured on one end to inner surface 48 of aperture assembly 28 and on another end to an inner surface 50 of backplane assembly 36. Unpopulated vertical cards 34 include an aperture assembly connector 52 on one end and a backplane assembly connector 54 on another end, each connector 52, 54 being connected to a printed circuit board (PCB) 56. A mating aperture assembly connector (not shown) for each vertical card aperture assembly connector 52 is mounted on aperture assembly 28 and a mating backplane assembly connector 58 is mounted on backplane assembly 36. DC and logic signals are routed between backplane assembly 36 and aperture assembly 28 through vertical cards 34 and provided to and from TRMs 30.

Figure 6:
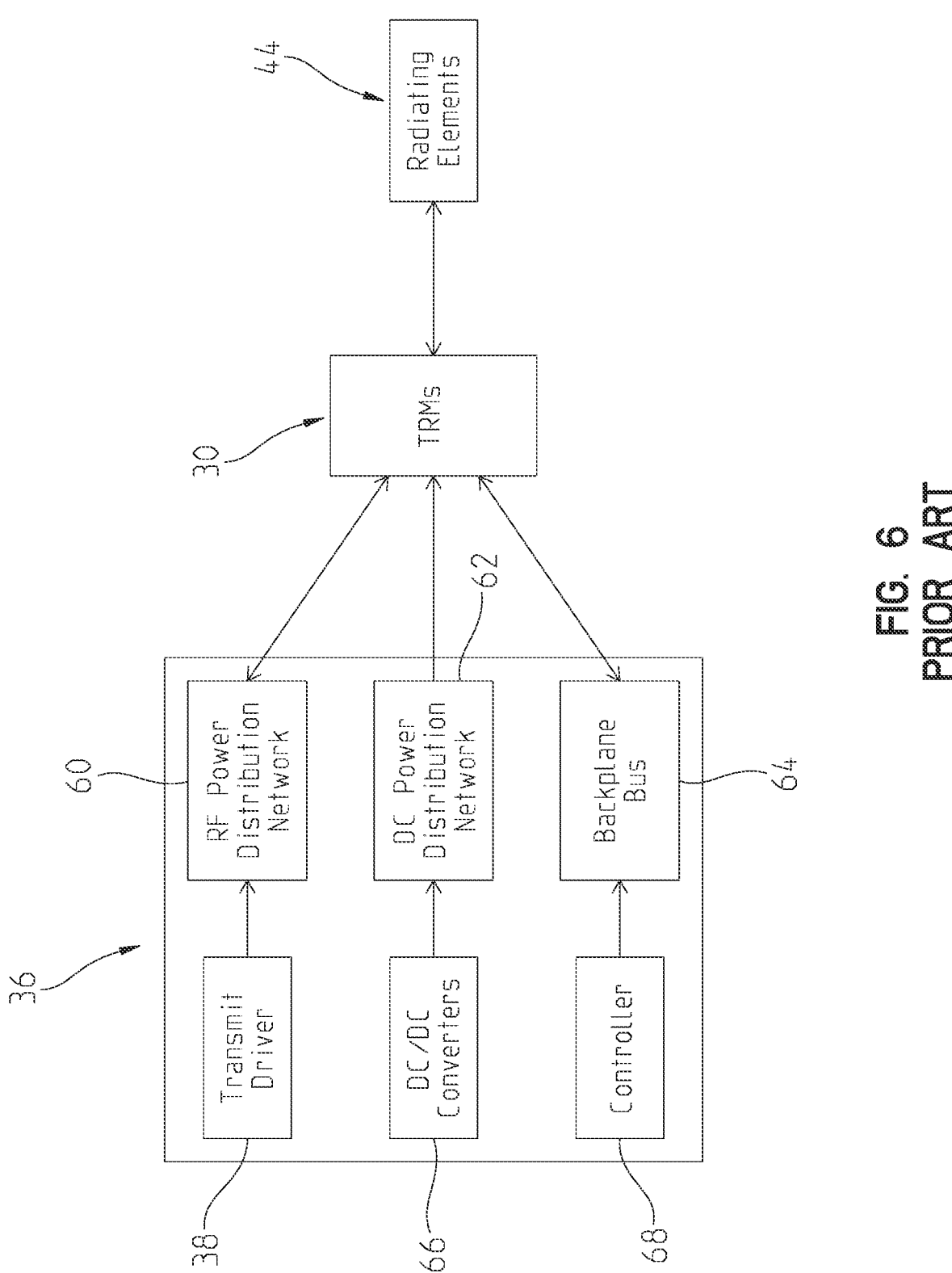
FIG. 6 is a block diagram of components of the tile of FIG. 2.

Backplane assembly 36 performs several functions, including DC/DC power conversion, DC power regulation and switching, antenna-to-panel interfacing, logic and control signal generation and fan-out, localized beam steering and built-in-test as is known to those skilled in the art. As depicted in FIG. 6, backplane assembly 36 generally includes an RF power distribution network 60, a DC power distribution network 62 and a backplane bus 64. Transmit driver 38 is physically mounted to backplane assembly 36, as are a plurality of DC/DC converters 66 and at least one controller 68 or on-assembly computer. In general, backplane assembly 36 provides power and control signals to TRMs 30, which in turn energize radiating elements 44, and receives receive signals from TRMs 30.

Figure 5:
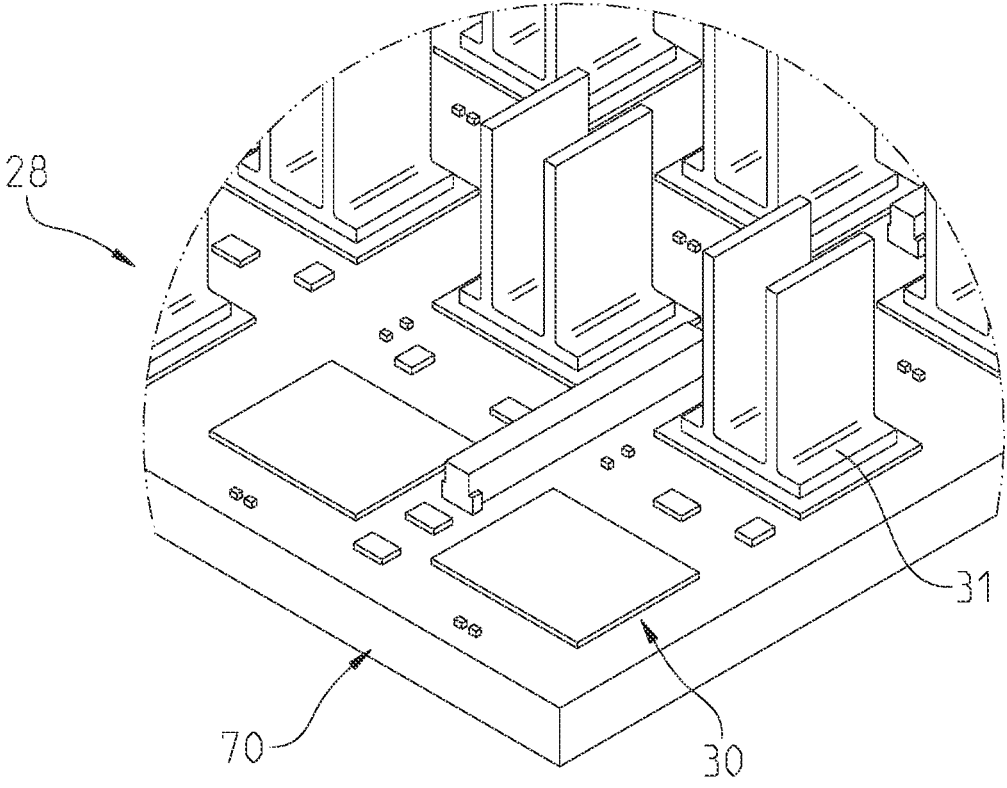
FIG. 5 is an enlarged view of a portion of the aperture assembly depicted in FIG. 4.
Figure 7:
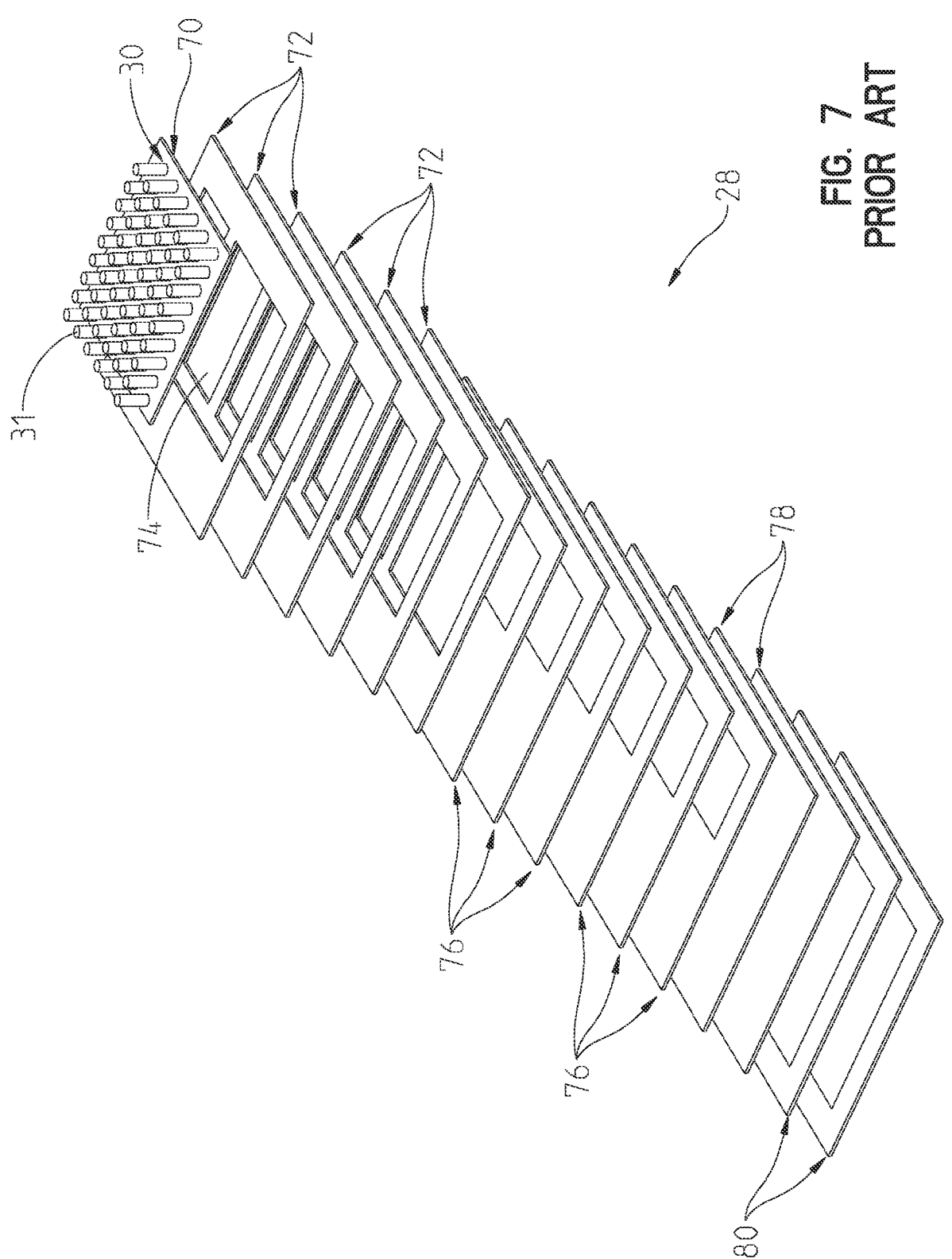
FIG. 7 is an exploded view of the aperture assembly and transmit/receive module ("TRM") depicted in FIG. 3.

Referring now to FIG. 7, a conventional aperture assembly 28 is shown with a plurality of TRMs 30 mounted to a TRM assembly 70. As best shown in FIG. 5, each TRM 30 includes a finned heat sink 31 mounted to the rear surface of the TRM 30. In this example, the first several layers 72 of aperture assembly 28 are used as DC power and logic control layers. Each of layers 72 includes a large cut-out which together form a cavity 74 configured to receive TRM assembly 70. Below cavity 74 is a plurality of additional layers 76 which generally function as the Rx and Tx beam formers. Two layers 78 below layers 76 form the hybrid antenna feed and the last two layers 80 form a dual stack configuration of radiating elements 44.

Figure 8:
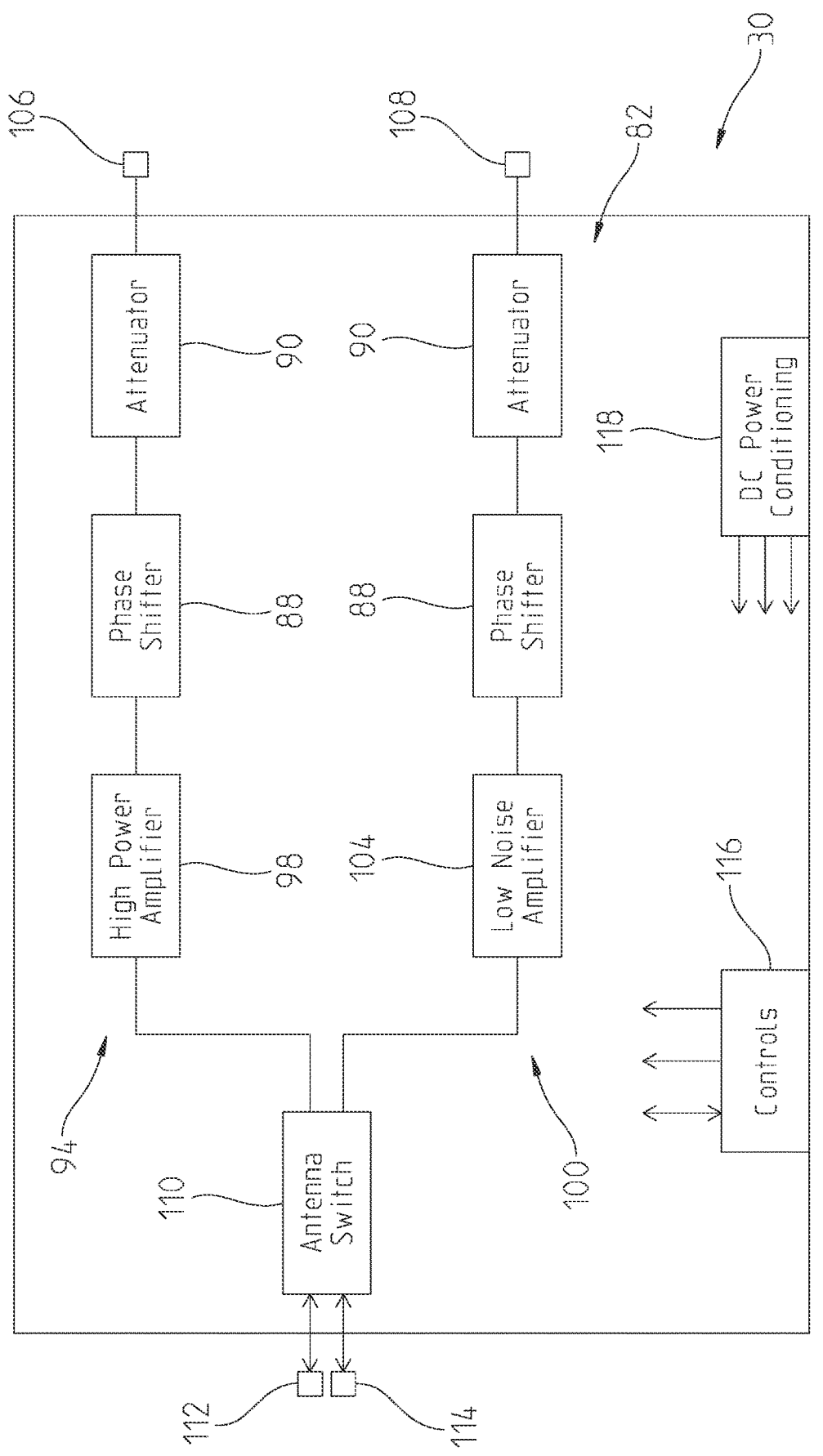
FIG. 8 is a block diagram of the TRM depicted in FIG. 3.

Referring now to FIG. 8, a simplified block diagram of TRM 30 is provided. TRM 30 generally includes a TRM PCB ("TRM assembly 82") having a plurality of layers (not shown) with a plurality of integrated circuits and other components mounted thereto. TRM 30 further includes a transmit channel 94 including high-power amplifier 98 and a receive channel 100 including low noise amplifier 104. High power amplifier 98 and low noise amplifier 104 are connected to a high-power antenna switch 110 which is connected to vertical polarization (V-pol) node 112 and horizontal polarization (H-pol) node 114. Finally, TRM 30 includes control electronics 116 and DC power conditioning circuitry 118 as is known to those skilled in the art.

As indicated above, the tile 26 architecture of locating TRMs 30 within cavity 74 of aperture assembly 28 results in a significant reduction in PCB area of aperture assembly 28 available for signal routing and other components. Consequently, aperture assembly 28 requires a larger number of layers than would be required if cavity 74 were not formed. Obviously, more layers increases the cost of aperture assembly 28 and tile 26. Additionally, the large number of heat sinks 31 mounted to TRMs 30 are expensive to attach and stress the solder joints attaching TRMs 30 to aperture assembly 28, as is also discussed above.

As should be apparent from the foregoing, each TRM 30 includes both transmit and receive components in transmit channel 94 and receive channel 100, respectively. The space available in the conventional configuration essentially limit the design to two receive channels for each single polarization usage or one receive channel per polarization for dual polarization configuration. Moreover, the control signals from backplane assembly 36 (e.g., from transmit amplifier 38) are routed all the way from backplane assembly 36 through vertical cards 34, to a lower layer of aperture assembly 28 for power division, and finally back to an upper layer of aperture assembly 28 to TRMs 30. This signal routing further increases cost and reduces the available real estate on aperture assembly 28 for other functionality. Also, as discussed above with reference to FIG. 7, aperture assembly 28 includes the transmit (and receive) beamformers (i.e., layers 76). The transmit beamformer functionality alone requires multiple layers of aperture assembly 28, adding to its thickness and cost of fabrication. Indeed, at a certain number of layers, the increased assembly thickness limits the number of suppliers capable of manufacturing the assemblies.

Other concerns have been identified regarding the architecture of tile 26. First is the location of the transmit amplifiers (e.g., high-power amplifier 98 of transmit channel 94 of TRM 30) on aperture assembly 28. In the event the amplifiers of TRMs 30 were to be changed (e.g., from GaAs to GaN for higher power), the entire aperture assembly 28 would need to be redesigned. Second, the RF signals are routed from backplane assembly 36 to aperture assembly 28 using expensive cables, which increases the overall cost of tile 26. Third, it is desirable to provide analog tiles for certain customers and certain applications and digital tiles for other customers and other applications. Because TRMs 30 are soldered to aperture assembly 28, different designs are required for analog and digital aperture assemblies.

Each of the above-mentioned concerns and drawbacks are addressed by the architecture of tile 200 according to the present disclosure. In general, tile 200 uses a similar flat panel assembly approach to that discussed above with reference to tile 26. However, tile 200 relocates certain functionality such as much of the transmit functionality to functional vertical cards 206 which replace unpopulated vertical cards 34 discussed above. By reconfiguring the architecture in the manner described below, tile 200 provides greatly increased flexibility and reduced cost.

Figure 9:
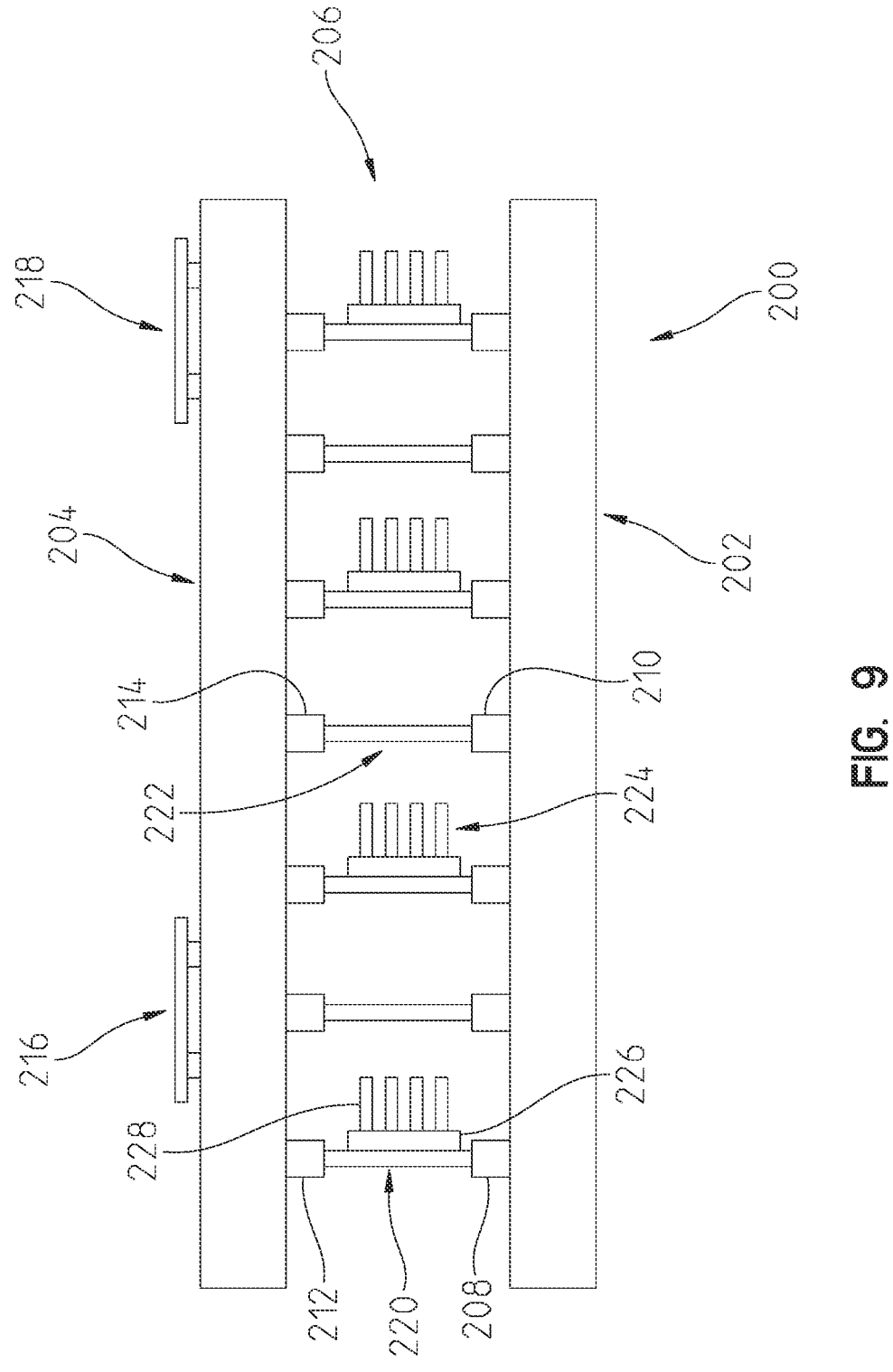
FIG. 9 is a side view of a configurable phased array tile, according to an embodiment.

FIG. 9 is a diagram illustrating a side view of a configurable tile 200, according to an embodiment. In an embodiment, configurable tile 200 is utilized with the phased array radar system 10 of FIG. 1. For example, configurable tile 200 corresponds to each of the one or more tiles of the aperture face 18 of the phased array radar system 10 of FIG. 1, in an embodiment. In other embodiments, configurable tile 200 is utilized with phased array radar systems different from the phased array radar system 10 of FIG. 1. Tile 200 generally includes an aperture assembly 202, a backplane assembly 204 and a plurality of vertical cards 206, including vertical transmit cards 220 and vertical receive cards 222. Aperture assembly 202 comprises a PCB, such as a multi-layer PCB, in an embodiment. Similarly, backplane assembly 202 and vertical cards 206 may comprise respective PCBs (e.g., multi-layer PCBs), in an embodiment. Tile 200 may also include spacers between backplane assembly 204 and aperture assembly 202, a housing, and handles like tile 26, but none of those components are shown for purposes of simplifying the description. The description below is of the lower level assembly (i.e., the integration of aperture assembly 202, vertical cards 206 and backplane assembly 204). The upper level assembly, which is not described in detail herein, includes the lower level assembly and cooling fans, a housing with connectors for other systems and handles for installation of tile 200 into a radar assembly, in an embodiment.

Aperture assembly 202 includes, among other things, a plurality of aperture assembly connectors, including transmit aperture assembly connectors configured to mate with corresponding connectors 208 on vertical transmit cards 220 and receive aperture assembly connectors configured to mate with corresponding connectors 210 on vertical receive cards 222. Backplane assembly 204 includes, among other things, a plurality of backplane assembly connectors, including transmit backplane assembly connectors configured to mate with corresponding connectors 212 on vertical transmit cards 220 and receive backplane assembly connectors configured to mate with corresponding connectors 214 on vertical receive cards 220. In certain embodiments, transmit aperture assembly connectors (and corresponding vertical card connectors 208) are 180 position edge-connectors and transit backplane assembly connectors (and corresponding vertical card connectors 212) are 180 position edge-connectors. In other embodiments, other suitable types of connectors are utilized.

Backplane assembly 204 also includes a plurality of removable daughter card assemblies including, in the depicted example, a controller daughter card assembly 216 (including the on-assembly computer such as controller 68 of FIG. 6 and a field programmable gate array (FPGA)) and a power supply daughter card assembly 218 (including the first order power supplies). By using the modular approach with daughter card assemblies 216, 218, the components most likely to need replacement as a result of assembly issues may be pre-tested prior to assembly. Additionally, backplane assembly 204 does not need to be redesigned for applications having different power requirements. A different power supply daughter card assembly 218 may simply be installed for the new requirements.

Configurable tile 200 may include different numbers of vertical transmit cards 220 and virtual receive cards 222 in various embodiments. For example, in an embodiment, configurable tile 200 includes 16 vertical transmit cards 220 (only four shown) and three vertical receive cards 222. In other embodiments, tile 200 includes a suitable number of vertical transmit cards 220 different than 16 and/or a suitable number of vertical receive cards 222 different than three. In an embodiment, each vertical transmit card 220 includes a plurality of transmit channels. Similarly, each vertical receive card 222 includes a plurality of receive channels, in an embodiment. For example, each vertical transmit card 220 includes four transmit channels and each vertical receive card 222 includes sixteen receive channels, in an embodiment. In an embodiment, each transmit channel on a vertical card 220 includes transmit channel components, such as some or all components of the transmit channel 94 (e.g., high power amplifier 98, phase shifter 88, attenuator 90) in FIG. 8. Thus, transmit channel components (e.g., high power amplifier 98, phase shifter 88, attenuator 90 of the transmit channel 94) are not included on the aperture assembly 202.

Figure 10:
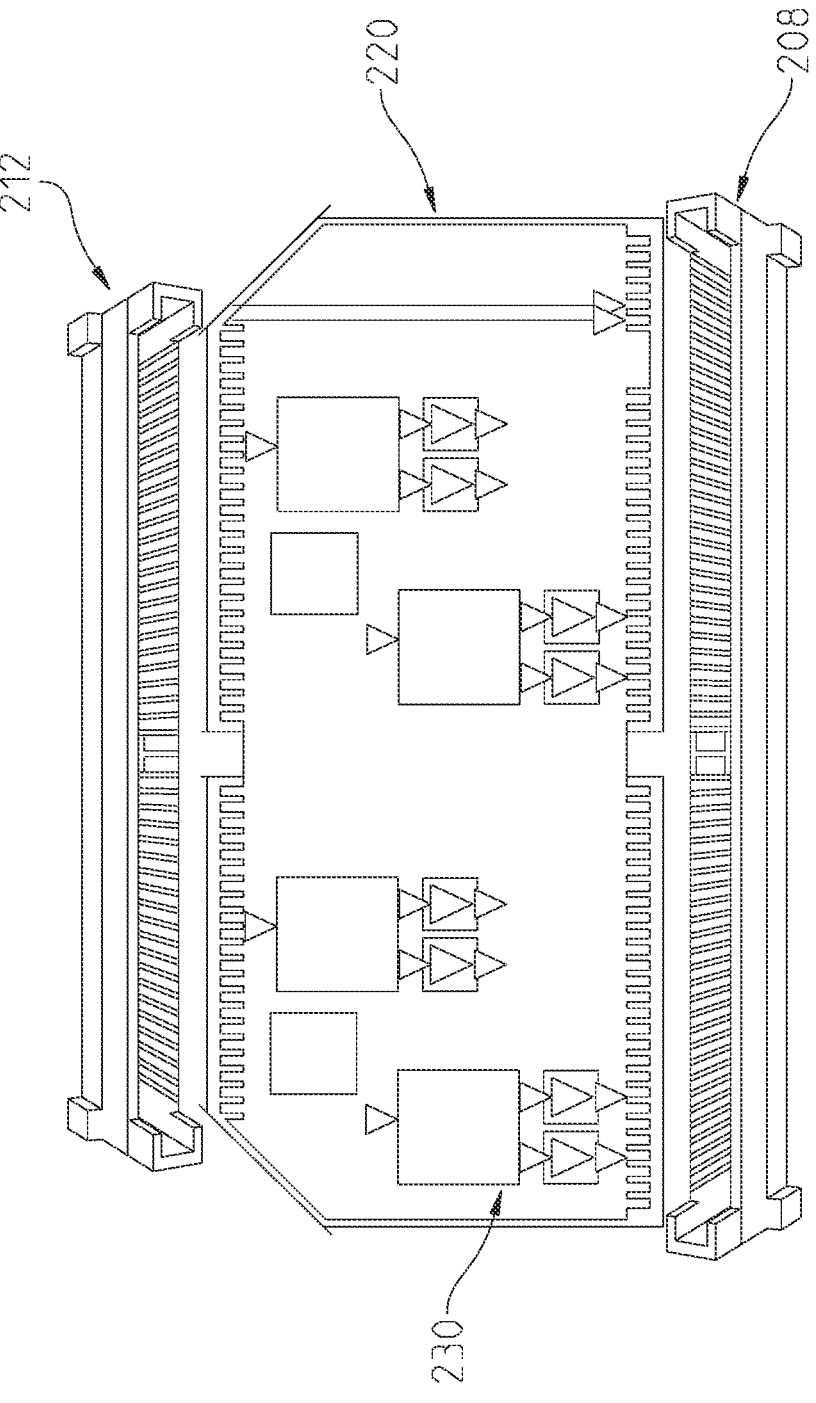
FIG. 10 is a top view of a vertical transmit card that may be used with the configurable phased array tile of FIG. 9, according to an embodiment.

In an embodiment, each transmit channel on a transmit vertical card 220 may be configured as a single polarization channel or a dual polarization channel. Referring briefly to FIG. 10, an example embodiment of a transmit vertical card 220 is illustrated. In this example embodiment, the transmit vertical card 220 includes four dual polarization transmit channels 230. In other embodiments, transmit vertical card 220 includes other suitable numbers of dual polarization transmit channels 230 and/or includes single polarization transmit channels. As will be explained in more detail below, transmitter channel components for only a single polarization may be populated for each of the transmit channel 230 on the transmit vertical card 220 when single polarization channels are desired (e.g., in single polarization radar applications), in some embodiments.

Referring again to FIG. 9, in an embodiment, each receive channel on a vertical receive card 222 comprises a transmission line (e.g., a trace) configured to pass a received signal from the aperture assembly 202 to the backplane 204. Receive channel components (e.g., low noise amplifier 104, phase shifter 88, attenuator 90 in FIG. 8) are included on the aperture assembly 202, in this embodiment. In another embodiment, at least some receive channel components are included on the vertical receive cards 222. In some embodiments, as described in more detail below, receive channels on a vertical receive card 222 may include digitizing components (e.g., analog to digital converters) to digitize receive signals prior to providing the signals as digitized outputs to the backplane 224.

In an embodiment, each vertical transmit card 220 includes, among other things, a heat sink 224 attached to one side to draw heat away from vertical transmit card 220 amplifiers (e.g., such as high power amplifier 98). Heat sink 224 includes a main plate 226 and a plurality of fins 228, in an embodiment. In other embodiments, other suitable heat sink configurations may be utilized. Because multiple transmit channels are included on a vertical transmit card 220, a single heat sink 224 may be used for the multiple transmit channels (e.g., four transmit channels as in the example vertical transmit card 220 illustrated in FIG. 10, reducing the number of heat sinks (e.g., for an 8×8 configuration, from 64 to 16), which reduces the overall attachment cost for the heat sinks, in an embodiment.

Figure 3:
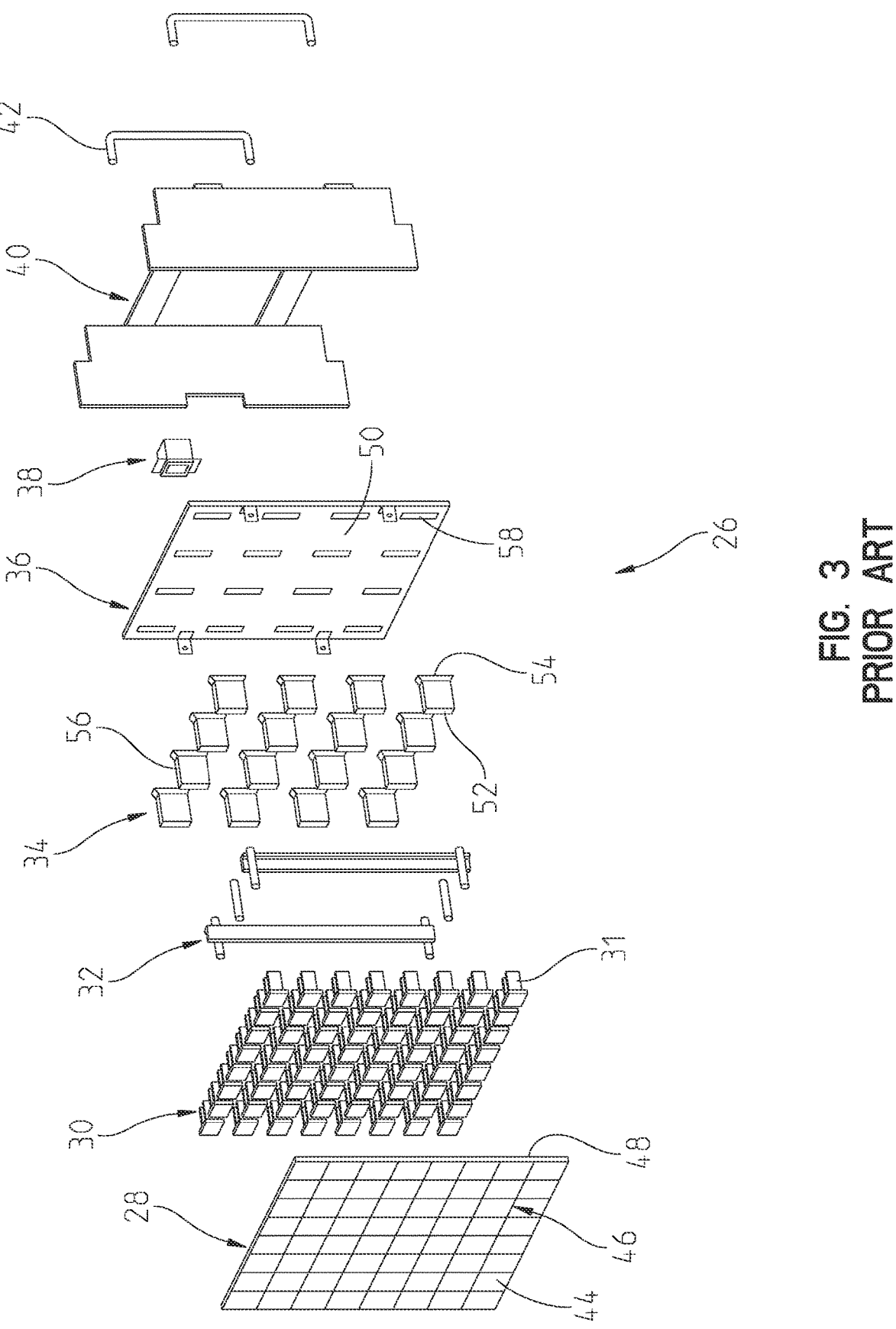
FIG. 3 is an exploded view of the tile of FIG. 2.
Figure 4:
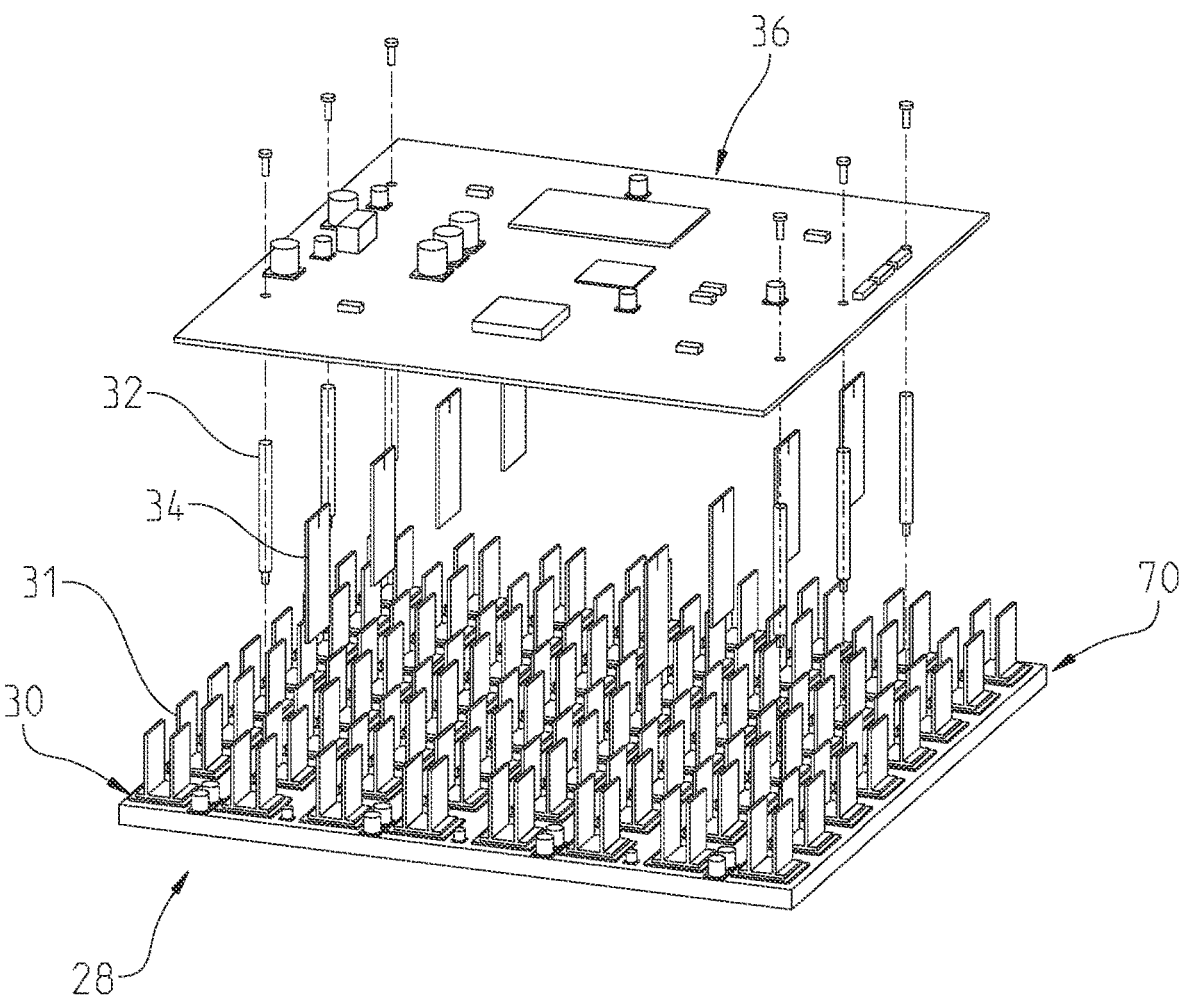
FIG. 4 is another exploded view of the tile of FIG. 2.

Like aperture assembly 28 of FIG. 3, aperture assembly 202 in this example includes 64 radiating elements 44 and beamforming with the associated electrical components. Aperture assembly 202 does not, however, include cavity 74

(FIG. 7) of aperture assembly 28 for receiving TRMs 30 as described above. This permits a substantial reduction in the number of PCB layers of aperture assembly 202 relative to aperture assembly 28 (e.g., a 50% reduction), which reduces the complexity and cost of aperture assembly 202. In an example embodiment, aperture assembly 202 comprises eight PCB layers. In another embodiment, aperture assembly 202 comprises another suitable number of PCB layers that is generally reduced relative to aperture assembly 28.

Vertical receive cards 222 can be configured for a variety of output configurations, digital beams or RF signals, all using the same tile topology. For example, vertical receive cards 222 may be configured to provide digitization of the receive signals for tiles 200 configured as digital tiles. For analog tiles 200, the combined receive outputs may be connected to backplane assembly 204 to be routed out of the tile. Additionally, as signals are routed through vertical receive cards 222 using connectors (as described below), the expensive cables of prior designs may be eliminated.

Vertical transmit cards 220 further include signal routing (e.g., PCB traces, not shown) for providing power and control signals from backplane assembly 204 to aperture assembly 202. In an embodiment, power and control signals routed through the vertical transmit cards 220 include power and control signals for receive channel components on the aperture assembly 202. In at least some embodiments, providing routing of power and control signals for receive channel components from the backplane 204 to the aperture assembly 202 on the vertical transmit cards 220 (rather than vertical receive cards 222) may allow for routing of control and power signals for a greater number of receive channels on the aperture assembly 202, for example in systems that include a relatively larger number of vertical transmit cards 220 (e.g., sixteen vertical transmit cards 220) as compared to a relatively smaller number of vertical receive cards 222 (e.g., three vertical receive cards 222).

In some embodiments, vertical transmit cards 220 can be partially populated as appropriate for single polarization or dual polarization applications. For example, a vertical transmit card 220 that includes dual-polarization transmit channels may be configured with i) transmit channel components for only a single polarization populated in each of the transmit channels for a single polarization application or ii) all transmit channel components populated for a dual polarization application. Similarly, vertical transmit cards 220 are flexibly configurable to include lower power amplifiers (e.g., GaAs amplifiers) or higher power amplifiers (e.g., GaN amplifiers). In some embodiments, the height of vertical transmit cards 220 may be varied depending on the height requirements of the application. For example, in lower channel count, single polarization applications, components other than the amplifiers and MOSFETs could be moved to backplane assembly 204.

Backplane assembly 204, like backplane assembly 36 of FIG. 3, provides power conditioning and digital control functionality for tile 200. In the exemplary embodiment of backplane assembly 204, however, the higher level power supplies are mounted on daughter card assemblies (e.g., power supply assembly 218) so they can be easily changed for different applications. Backplane assembly 204 also includes electronics to amplify and split the transmit signal, and signal routing to distribute the transmit signal to the various vertical transmit cards 220, in an embodiment. In conventional tile 26, the transmit splitter functionality was built in to the layers of aperture assembly 28 because TRMs 30 were mounted to aperture assembly 28. In tile 200, transmit channel functionality is moved to vertical transmit cards 220, between backplane assembly 204 and aperture assembly 202. As such, some of the transmit splitting is performed on backplane assembly 204. Also, one or more splitters may be included on a vertical transmitter card 222. As an example, in an embodiment in which each vertical transmit card 220 includes four transmit channels, a four-way split for the transmit channels may be provided on the vertical transmit card 220. Moving the splitting function in the above-described manner reduces the complexity and therefore the cost of aperture assembly 202 and provides more space for additional receive channels.

Regarding thermal management, tile 200 is cooled through the combination of heat sinks 224 on vertical transmit cards 220 and fans (not shown) mounted within tile 200. Cooling air passes through five channels per tile 200, and each tile 200 includes a separate air intake and air output to avoid recirculation of heated air. In this manner, the active components (particularly on vertical transmit cards 220) are maintained below a maximum allowable junction temperature, and the temperature variation between amplifiers is minimized. Baffles (not shown) are also provided inside the tile housing to balance the cooling and prevent hot spots. Thus, unlike prior approaches where air is blown through multiple tiles 26, resulting in the last-in-line tile 26 operating at a higher temperature than the first tile 25 to receive the cooling air, according to the present disclosure where fans and air routing is provided for individual tiles 200, the tiles 200 operate at substantially the same temperature. The common operating temperature provides more balanced RF output power.

The architecture represented by tile 200 permits simple reconfiguration for different applications by simply using different vertical card assemblies 206. For example, for an S-band radar tile with an 8×8 array of radiating elements 44, tile 200 may be reconfigured for a receive only application by selecting the appropriate power supply daughter cards and not populating the transmit components on vertical the transmit cards 220 (the receive controls would still pass through these cards). Receive and transmit applications with wide range transmit power requirements may be configured by replacing power supply daughter cards 218 and vertical transmit cards 220. Alternatively, analog signals could be output directly by passing them through vertical receive cards 222, or the analog signals could be digitized on different vertical receive cards 222 and provided as a digitized output. Tile 200 can be reconfigured from dual polarized to single polarized by simply changing vertical transmit cards 220, vertical receive cards 222 and power supply daughter cards 218.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A configurable phased array tile, comprising:
an aperture assembly having a plurality of aperture assembly connectors;
a backplane assembly having a plurality of backplane assembly connectors; and
a plurality of vertical transmit cards mounted to a corresponding first plurality of aperture assembly connectors and a corresponding first plurality of backplane assembly connectors, the plurality of vertical transmit cards being removably coupled to the aperture assembly and the backplane assembly, the plurality of vertical transmit cards extending between the aperture assembly and the backplane assembly;
wherein the plurality of vertical transmit cards each include at least one transmit channel including at least one high power transmit amplifier for powering at least one radiating element connected to the aperture assembly.

2. The configurable phased array tile of claim 1, further comprising a plurality of vertical receive cards mounted to a corresponding second plurality of aperture assembly connectors and a corresponding second plurality of backplane assembly connectors, each of the plurality of vertical receive cards including a plurality of receive channels.

3. The configurable phased array tile of claim 1, wherein the backplane assembly includes a plurality of removable daughter card assemblies including a controller daughter card assembly and a power supply daughter card assembly.

4. The configurable phased array tile of claim 1, wherein each of the plurality of vertical transmit cards includes a heat sink mounted to a side of the vertical transmit card to draw heat from the at least one high power transmit amplifier.

5. The configurable phased array tile of claim 4, further including at least one fan positioned to force air flow through at least one channel between rows of the plurality of vertical transmit cards.

6. The configurable phased array tile of claim 1, wherein each of the plurality of vertical transmit cards includes signal routing for power and control signals from the backplane assembly to the aperture assembly.

7. The configurable phased array tile of claim 1, wherein the backplane assembly includes a transmit splitter circuit for splitting a transmit signal to the plurality of vertical transmit cards.

8. The configurable phased array tile of claim 7, wherein each of the plurality of vertical transmit cards includes a transmit splitter to split the transmit signal to the plurality of transmit channels.

9. A phased array radar system, comprising:
an antenna assembly including at least one panel with a corresponding aperture face including at least one tile; and
a base configured to support the antenna assembly;
wherein the at least one tile includes
an aperture assembly having a plurality of aperture assembly connectors,
a backplane assembly having a plurality of backplane assembly connectors, and
a plurality of vertical transmit cards mounted to a corresponding first plurality of aperture assembly connectors and a corresponding first plurality of backplane assembly connectors;
wherein the plurality of vertical transmit cards each include a plurality of transmit channels including at least one high power transmit amplifier for powering at least one radiating element connected to the aperture assembly.

10. The phased array radar system claim 9, wherein the at least one tile further includes a plurality of vertical receive cards mounted to a corresponding second plurality of aperture assembly connectors and a corresponding second plurality of backplane assembly connectors, each of the plurality of vertical receive cards including a plurality of receive channels.

11. The phased array radar system of claim 9, wherein the backplane assembly includes a plurality of removable daughter card assemblies including a controller daughter card assembly and a power supply daughter card assembly.

12. The phased array radar system of claim 9, wherein each of the plurality of vertical transmit cards includes a heat sink mounted to a side of the vertical transmit card to draw heat from the at least one high power transmit amplifier.

13. The phased array radar system of claim 12, further including at least one fan positioned to force air flow through at least one channel between rows of the plurality of vertical transmit cards.

14. The phased array radar system of claim 9, wherein each of the plurality of vertical transmit cards includes signal routing for power and control signals from the back-plane assembly to the aperture assembly.

15. The phased array radar system of claim 9, wherein the backplane assembly includes a transmit splitter circuit for splitting a transmit signal to the plurality of vertical transmit cards.

16. The phased array radar system of claim 15, wherein each of the plurality of vertical transmit cards includes a transmit splitter to split the transmit signal to the plurality of transmit channels.

17. A radar tile, comprising:

a plurality of radiating elements mounted on an aperture face;

a plurality of transmit cards removably connected to the aperture face and oriented perpendicular to the aperture face, the plurality of transmit cards each including a plurality of transmit amplifiers configured to provide a transmit signal to a corresponding plurality of radiating elements; and a backplane assembly configured to provide the transmit signal to the plurality of transmit cards.

18. The radar tile of claim 17, further comprising a plurality of receive cards removably connected to the aperture face and oriented perpendicular to the aperture face, the plurality of receive cards each including a plurality of receive channels.

19. The radar tile of claim 17, wherein the backplane assembly includes a plurality of removable daughter card assemblies including a controller daughter card assembly and a power supply daughter card assembly.

20. The radar tile of claim 17, wherein each of the plurality of transmit cards includes a heat sink mounted to a side of the transmit card to draw heat from the plurality of transmit amplifiers.

\* \* \* \* \*